US009067507B2

(12) United States Patent
Makino

(10) Patent No.: US 9,067,507 B2
(45) Date of Patent: Jun. 30, 2015

(54) ELECTRIC AUTOMOBILE

(71) Applicant: NTN CORPORATION, Osaka (JP)

(72) Inventor: Tomoaki Makino, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/355,454

(22) PCT Filed: Nov. 8, 2012

(86) PCT No.: PCT/JP2012/078929
§ 371 (c)(1),
(2) Date: Apr. 30, 2014

(87) PCT Pub. No.: WO2013/069718
PCT Pub. Date: May 16, 2013

(65) Prior Publication Data
US 2014/0288752 A1    Sep. 25, 2014

(30) Foreign Application Priority Data
Nov. 11, 2011   (JP) .................................. 2011-247145

(51) Int. Cl.
G06F 17/00   (2006.01)
B60L 15/20   (2006.01)
(Continued)

(52) U.S. Cl.
CPC ................. *B60L 15/20* (2013.01); *B60L 3/102* (2013.01); *B60L 3/106* (2013.01); *B60L 11/1803* (2013.01);
(Continued)

(58) Field of Classification Search
CPC ..... Y02T 10/7077; B60K 6/445; B60L 11/14; B60W 10/08; B60W 20/00
USPC ........... 701/22; 180/65.265, 65.275, 197, 415
See application file for complete search history.

(56) References Cited

U.S. PATENT DOCUMENTS 5,453,930 A * 9/1995 Imaseki et al. .................. 701/22
6,615,940 B2 * 9/2003 Morisawa ..................... 180/65.1
(Continued)

FOREIGN PATENT DOCUMENTS

JP    2-299402    12/1990
JP    10-295004   11/1998
(Continued)

OTHER PUBLICATIONS

International Search Report mailed Feb. 19, 2013 in corresponding International Patent Application No. PCT/JP2012/078929.
(Continued)

*Primary Examiner* — McDieunel Marc

(57) ABSTRACT

An electric vehicle is provided in which left and right drive wheels are driven by respective motors, and which enables slip control in a simple structure while preventing a driver who used to drive an engine vehicle with a differential from feeling uncomfortable. The vehicle includes a controller having a computer controlling the two motors including a basic control unit, a slip determiner, and a dual-wheel-drive-reduction unit. The control unit determines driving forces of the motors such that the forces are equal to each other, depending on a depression of an accelerator pedal. The determiner detects slippage between each of the wheels, and a road surface. The dual-wheel-drive-reduction unit reduces, when the determiner determines that greater slippage has occurred at at least one of the wheels, drive currents of the motors.

6 Claims, 2 Drawing Sheets

(51) Int. Cl.
*B60L 3/10* (2006.01)
*B60L 11/18* (2006.01)

(52) U.S. Cl.
CPC ......... *B60L 15/2036* (2013.01); *B60L 2220/14* (2013.01); *B60L 2220/44* (2013.01); *B60L 2220/46* (2013.01); *B60L 2240/421* (2013.01); *B60L 2240/461* (2013.01); *Y02T 10/7005* (2013.01); *Y02T 10/648* (2013.01); *B60L 11/1877* (2013.01); *B60L 2240/12* (2013.01); *B60L 2240/465* (2013.01); *B60L 2200/26* (2013.01); *Y02T 10/705* (2013.01); *Y02T 10/7275* (2013.01)

(56) References Cited

U.S. PATENT DOCUMENTS

| | | | | |
|---|---|---|---|---|
| 6,909,959 | B2 * | 6/2005 | Hallowell | 701/88 |
| 7,279,855 | B2 * | 10/2007 | Tahara et al. | 318/46 |
| 7,828,093 | B2 * | 11/2010 | Hanada et al. | 180/65.265 |
| 8,046,124 | B2 * | 10/2011 | Muta et al. | 701/22 |
| 8,113,307 | B2 * | 2/2012 | Holland | 180/65.1 |
| 8,392,041 | B2 * | 3/2013 | Uchiyama et al. | 701/22 |
| 8,521,384 | B2 | 8/2013 | O'Connor et al. | |
| 2006/0152180 | A1 * | 7/2006 | Tahara et al. | 318/139 |
| 2007/0187158 | A1 * | 8/2007 | Muta et al. | 180/65.1 |
| 2009/0159350 | A1 * | 6/2009 | Hanada et al. | 180/65.265 |
| 2009/0192691 | A1 | 7/2009 | O'Connor et al. | |
| 2010/0185351 | A1 * | 7/2010 | Uchiyama et al. | 701/22 |

FOREIGN PATENT DOCUMENTS

| | | |
|---|---|---|
| JP | 11-8901 | 1/1999 |
| JP | 11-254986 | 9/1999 |
| JP | 2000-221207 | 8/2000 |
| JP | 2006-166572 | 6/2006 |
| JP | 2006-258289 | 9/2006 |
| JP | 2009-184662 | 8/2009 |
| JP | 2010-220448 | 9/2010 |

OTHER PUBLICATIONS

International Preliminary Report on Patentability mailed on May 22, 2014 in corresponding International Patent Application No. PCT/JP2012/078929.

* cited by examiner

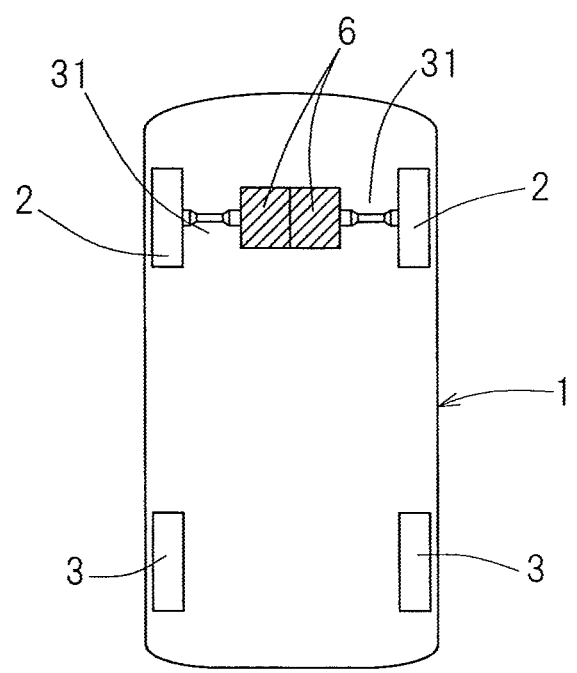

ELECTRIC AUTOMOBILE

CROSS REFERENCE TO THE RELATED APPLICATION

This application is a U.S. national stage application of PCT/JP2012/078929 filed Nov. 8, 2012 and claims foreign priority benefit of Japanese Patent Application No. 2011-247145 filed Nov. 11, 2011 in the Japanese Intellectual Property Office, the contents of which are incorporated herein by reference.

BACKGROUND OF THE INVENTION

1. Field of the Invention

The present invention relates to an electric vehicle including left and right drive wheels driven by respective independent motors, more particularly to a simple and low-cost electric vehicle such as a small single-seater vehicle.

2. Description of Related Art

Small single-seater vehicles are allowed to travel over public roads in Japan. Further, small low-cost electric vehicles are in demand in various countries. To date, in such a small simple low-cost vehicle, a drive mode in which rotation is transmitted to left and right wheels through a differential with the use of a single engine, has been employed. Even in an electric vehicle, rotation is transmitted to left and right wheels through a differential with the use of a single motor, in general.

In the small simple electric vehicle as described above, in-wheel motors or the like can be employed so as to drive left and right drive wheels by respective independent motors to reduce the weight of the vehicle (for example, Patent Document 1). The electric vehicle in which the left and the right drive wheels are driven by respective independent motors, may travel over a road surface in different conditions. Therefore, slip control is preferably performed by utilizing a property of a motor exhibiting a high responsiveness.

[Patent Document 1] JP Laid-open Patent Publication No. 2006-258289

SUMMARY OF THE INVENTION

However, in a case where slip control is performed independently for the left and the right wheels, a driver who used to drive an engine vehicle with a differential, may feel uncomfortable with traveling performance, due to the motors exhibiting high responsiveness.

An object of the present invention is to provide an electric vehicle in which left and right drive wheels are driven by respective independent motors, which enables slip control to be performed with a simple structure while preventing a driver who used to drive an engine vehicle with a differential from feeling uncomfortable. The general aspects of the present invention will now be described using the reference signs in the figures showing embodiments.

An electric vehicle according to one aspect of the present invention is an electric vehicle that includes: left and right drive wheels 2, 2; two electric motors 6, 6 configured to drive the left and the right drive wheels 2, 2, respectively; and a controller 11 configured to control the two motors 6, 6.

The control unit 11 includes:
a basic control unit 14 configured to determine driving forces to be generated by the two motors 6, 6 such that the driving forces are equal to each other, the driving forces depend on a depression of an accelerator pedal 22 operated by a driver;

a slip determination unit 15 configured to determine whether or not slippage with the degree not less than a predetermined value occurs between each of the left and the right drive wheels 2, 2, and a road surface; and a dual-wheel drive reduction unit 16, which is operable at slippage, configured to reduce, when the slip determination unit 15 determines that the slippage with the degree not less than the predetermined value has occurred between at least one of the left and the right drive wheels 2, 2, and the road surface, drive currents of both the two motors 6, 6 to a same or common first predetermined current value or below, or by a same or common first predetermined proportion or greater.

Each motor 6 may form an in-wheel motor drive system 8. The motors may be mounted to a vehicle body so as to be distant from the drive wheels 2, 2 driven by the motors 6, and rotation of the motors 6 may be transmitted to the drive wheels 2 through a drive transmission component 31.

In this configuration, the slip determination unit 15 is provided, and when the slip determination unit 15 determines that the slippage with the degree not less than a predetermined value has occurred between the drive wheel 2 and a road surface, the dual-wheel drive reduction unit 16 reduces drive currents of the motors 6. Thus, the slippage can be suppressed and tire grip force can be restored, resulting in stabilizing the traveling. In this case, the dual-wheel drive reduction unit 16 reduces drive currents of both the left and the right motors 6, 6 to the same current not greater than first predetermined current value, or by the same proportion not less than first predetermined proportion. Therefore, unlike in a case where driving of one, of the drive wheels 2, at which the slippage has occurred is suppressed, a driver is allowed to feel like driving a vehicle including a differential, and slip control can be performed while preventing the driver from feeling uncomfortable. Further, the drive currents of both the left and the right motors 6, 6 can be reduced in the same manner, thereby simplifying a configuration of a control system.

In the above configuration, an on-off switch 25 configured to be turned on or off by a driver may be further provided, and the controller 11 may further include a single-wheel drive reduction unit 17, which is operable at slippage, configured, when the slip determination unit 15 determines that the slippage with the degree not less than the predetermined value has occurred between one of the left and the right drive wheels 2, 2 and the road surface while the on-off switch 25 is on, to reduce a motor current in one, of the motors 6, which drives the one of the drive wheels 2 at which the slippage with the degree not less than the predetermined value has been determined to occur, to a second predetermined current value or below, or by a second predetermined proportion or greater, and to cause the other, of the motors 6, which drives the other, of the drive wheels 2, at which the slippage has not been determined to occur, to generate a driving force that depends on a depression of the accelerator pedal 22 operated by the driver.

The second predetermined current value and the second predetermined proportion may be equal to or different from the first predetermined current value and the first predetermined proportion, respectively.

The vehicle may sometimes travel in a state where only one of the wheels is on a road surface on which slippage is likely to occur, such as a muddy road surface, a snow road surface or an icy road surface. Assuming that in the vehicle traveling in such state, drive currents of the motors 6 for both the left and the right wheels 2, 2, are reduced, driving force becomes insufficient, and thus traveling speed may be excessively reduced. On the other hand, the single-wheel drive reduction unit 17 as described above can make one of the wheels 2, at which no slippage has occurred, driven, thereby decreasing the degree of reduction in speed as is caused by insufficient driving force. In a state where only one of the wheels 2 is being driven, a direction in which the vehicle travels may be changed due to difference in driving force between the left side and the right side. However, the single-wheel drive reduction unit 17 is caused to be activated while the on-off switch 25 configured to be turned on or off by a driver is on. Therefore, change of a traveling direction against a driver's intention may not occur. Since the driver expects that the vehicle traveling direction changes, he or she can operate a steering wheel so as to travel straight.

In the above configuration, a drive wheel rotation detection unit 18 for detecting rotation of the drive wheels 2, or a motor rotation detection unit 19 for detecting rotation speeds of the motors 6, may be further provided. The slip determination unit 15 may determine, when a change rate of the rotation speed (that is, the rotation speed of the motor 6) of the drive wheel 2 which is detected by the drive wheel rotation detection unit 18, or a change rate of the rotation speed of the motor 6 which is detected by the motor rotation detection unit 19, is greater than a preset threshold value of a rotation speed change rate, that the slippage with the degree not less than the predetermined value has occurred between the drive wheel 2 and a road surface.

A state of slip is determined based on not a rotation speed but a rotation speed change rate, thereby allowing a degree or level of slippage to be accurately detected. In general, when slippage occurs, reduction of load on the motor causes rapid increase of the number of rotations of the motor. Accordingly, based on the rotation speed change rate, slippage can be detected.

In the above configuration, when a circumferential speed of a drive wheel tire outer circumference is calculated based on a detected value of the rotation speed of the drive wheel 2 to be slip-determined or a detected value of the rotation speed of the motor 6 for the drive wheel 2 to be slip-determined, and a difference between a vehicle speed and the circumferential speed of the drive wheel tire outer circumference becomes greater than a predetermined difference threshold value, the slip determination unit 15 may determine that the slippage with the degree not less than the predetermined value has occurred between the drive wheel 2 and the road surface.

According to the difference between the vehicle speed and a detected value, a state of slip can also be easily determined.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 illustrates an electric vehicle, in a planer view, according to a second embodiment of the present invention.

DESCRIPTION OF EMBODIMENTS

Figure 1:
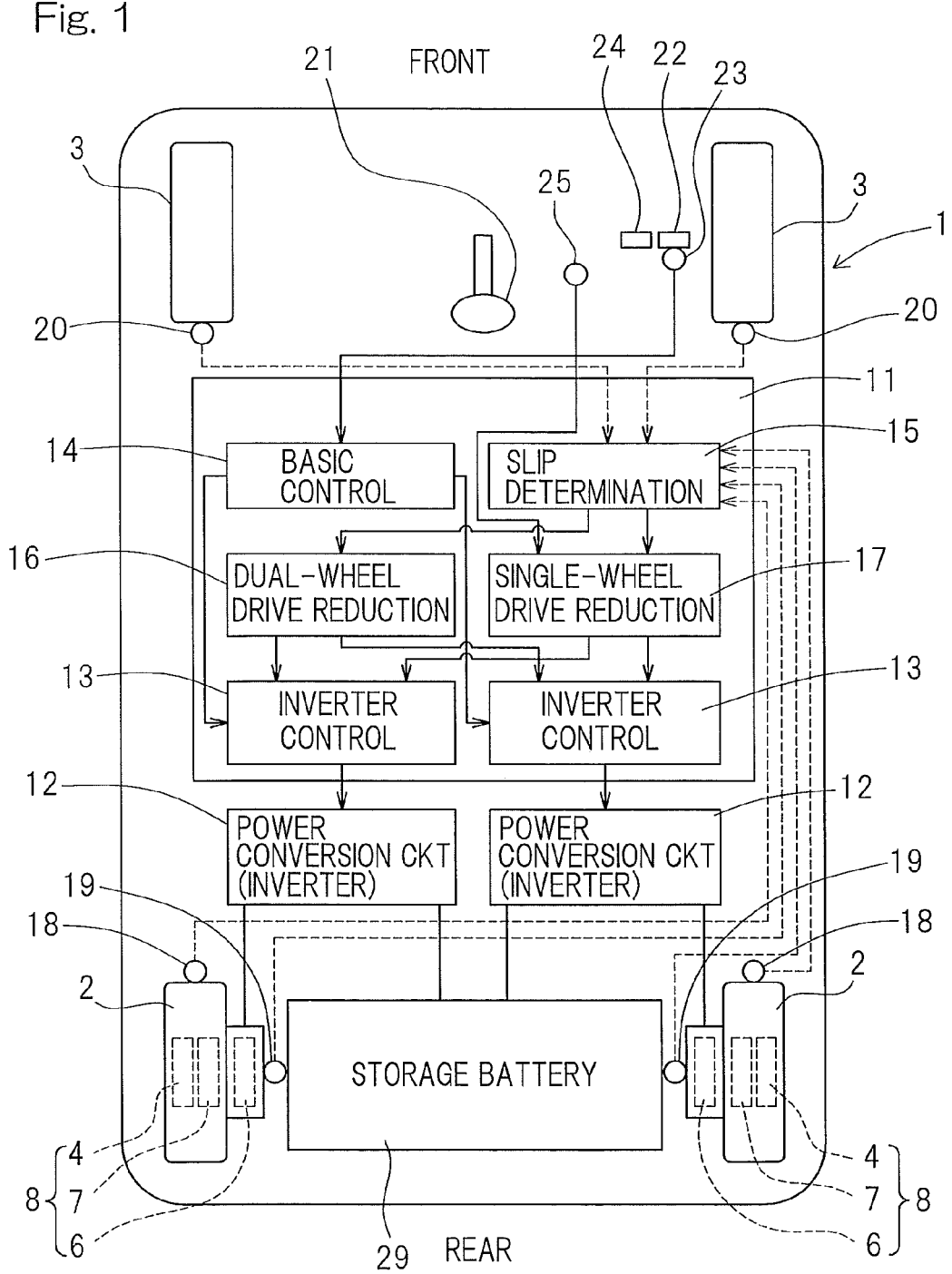
FIG. 1 illustrates an electric vehicle, in a planer view, according to a first embodiment of the present invention, including a block diagram showing a schematic configuration of a control system thereof.

Embodiments of the present invention will be described with reference to the drawings.

FIG. 1 is a plan view illustrating an electric vehicle according to a first embodiment, including a block diagram showing a schematic configuration of a control system thereof. The electric vehicle may be a small single-seater electric vehicle. The electric vehicle may be a four-wheel vehicle that includes a vehicle body 1 with left and right rear wheels and left and right front wheels 3, with the rear wheels being drive wheels 2 and the front wheels 3 being driven wheels. The front wheels 3 are steered wheels. The left and the right rear drive wheels 2, 2 are driven by respective independent in-wheel motors 6, 6.

Rotation of each motor 6 is transmitted through a reducer unit 7 and a rotational ring of a wheel bearing 4 to the drive wheel 2. The motor 6, the reducer unit 7, and the wheel bearing 4 are integrally assembled into an in-wheel motor unit 8. The motor 6 may be an interior permanent magnet synchronous motor. The reducer unit 7 may be a cycloidal reducer, and has 10 or more high reduction ratios. In each in-wheel motor unit 8, the motor 6 is disposed near the wheel 2, and a part or the entirety of the in-wheel motor unit 8 may be disposed within the wheel 2. A storage battery 29 is used as power sources for driving both of the motors 6, 6, and for an electrical system in the vehicle.

A steering system will be described. In a driver seat of the vehicle body 1, a steering wheel 21, an accelerator pedal 22, and a brake pedal 24 are provided. The steered wheels 3, 3 are steered by the steering wheel 21. A depression of the accelerator pedal 22 is detected by a depression detection unit 23. In a control panel (not shown) in front of a driver seat, having a speedometer and the like, an on-off switch 25 is provided for allowing selection of slip control described below.

A control system will be described. The control system operates to drive the two motors 6, 6 that are provided on the left side and the right side, corresponding to the left and the right drive wheels 2, respectively. The control system includes: a single control unit 11 that is shared by the left and the right motors 6, 6; and two power conversion circuits 12, 12 for the respective left and the right motors 6, 6. The control unit 11 may include a computer such as a microcomputer, programs executed by the computer, various electronic circuits. Each power conversion circuit 12 may be implemented as an inverter that converts direct current from the storage battery 29 to alternating current. The inverter may include semiconductor switching elements.

The power conversion circuits 12 may be power-controlled by two inverter control units 13, 13, respectively, provided in the control unit 11, with PWM control. As shown in FIG. 1, the two inverter control units 13 may be provided, one for each of the power conversion circuits 12. However, only single inverter control unit 13 may be provided as long as the power conversion circuits 12 can be controlled. Each of the motors 6 includes a motor rotation detection unit 19 for detecting a rotation speed of the motor. In the drive wheels 2, drive wheel rotation detection units 18 for detecting rotation speeds thereof may be provided, respectively. In the driven wheels 3, wheel rotation detection units 20 for detecting rotation speeds thereof may be provided, respectively.

The control unit 11 includes a basic control unit 14, a slip determination unit 15, a dual-wheel drive reduction unit 16, a single-wheel drive reduction unit 17, and the two inverter control units 13, 13.

The basic control unit 14 operates to determine, in normal traveling, driving forces to be generated by the left and the right motors 6, 6 such that the driving forces are equal to each other, which depend on depression of the accelerator pedal 22 operated by a driver. The depression is detected by the depression detection unit 23. The above-described "normal traveling" represents a traveling state other than the state that is controlled by the dual-wheel drive reduction unit 16 or the single-wheel drive reduction unit 17.

The slip determination unit 15 operates to determine a state of slip between each drive wheel 2 and the road surface over which the drive wheel 2 is traveling, that is, a state of slip between a tire of each drive wheel 2 and the road surface. The slip determination unit 15 determines, when a change rate of a rotation speed (that is, a rotation speed of the motor 6) of the drive wheel 2, which is detected by the drive wheel rotation detection unit 18, or a change rate of a rotation speed of the motor 6, which is detected by the motor rotation detection unit 19, is greater than a preset threshold value of the rotation speed change rate, that the slippage with the degree or level not less than a predetermined value has occurred between the drive wheel 2 and the road surface over which the drive wheel 2 is traveling. In general, when slippage occurs, the number of rotations of the motor and the number of rotations of the drive wheel rapidly increase due to a load on the motor being reduced. Therefore, a rotation speed change rate at which a rotation speed of the motor or the drive wheel rapidly increases is set as the threshold value of the rotation speed change rate as described above, to determine whether or not slippage has occurred. The threshold value of the rotation speed change rate may be appropriately set according to a test, a simulation, or the like. This determination is executed for each of the two drive wheels 2, 2 on the left and the right sides.

Alternatively, the slip determination unit 15 may determine that slippage with the degree not less than the predetermined value has occurred between the drive wheel 2 and the road surface, when a difference between a vehicle speed, and a circumferential speed of a drive wheel tire outer circumference as is calculated based on a detected value of a rotation speed of the drive wheel 2 to be slip-determined, or a detected value of a rotation speed of the motor 6 for the drive wheel 2 to be slip-determined, becomes greater than a predetermined difference value. The vehicle speed may be obtained in any manner. For example, the vehicle speed may be estimated according to calculation based on a rotation speed of each drive wheel 2, or may be calculated according to a rotation speed detected from each driven wheel 3.

The dual-wheel drive reduction unit 16 operates to reduce drive currents of both the left and the right motors 6, 6 to a predetermined current value (a first predetermined current value) or below, or by a predetermined proportion (a first predetermined proportion) or greater, when the slip determination unit 15 determines that slippage with the degree not less than the predetermined value has occurred between at least one of the left and the right drive wheels 2, 2 and the road surface over which the at least one of the wheels are traveling. The drive current of the left motor 6 and the drive current of the right motor 6 are reduced to the common current value (the first predetermined current value) or below, or by the common proportion (the first predetermined proportion) or greater. Whether or not "slippage with the degree not less than the predetermined value" is determined, as described above, according to whether or not a change rate of a rotation speed of the motor 6 or the drive wheel 2 is greater than or equal to the preset threshold value of the rotation speed change rate, or whether or not a difference between a vehicle speed and a circumferential speed of a drive wheel tire outer circumference as is calculated according to a detected value of a rotation speed, is greater than or equal to a predetermined difference threshold value. A target value to which drive currents of the motors 6 are to be reduced may be "a predetermined current value" that is a fixed value as described above, or may be a value represented by a predetermined proportion of a most recent motor current. Further, the predetermined current value that is a fixed value, or the predetermined proportion may be appropriately obtained according to a test, a simulation, or the like.

The single-wheel drive reduction unit 17 operates as follows while the on-off switch 25 is on. That is, when the slip determination unit 15 determines that slippage with the degree not less than the predetermined value has occurred between one of the left and the right drive wheels 2 and the road surface over which the one of the wheels is traveling, the single-wheel drive reduction unit 17 reduces only a motor current of the motor 6 for the drive wheel 2 at which the greater slippage has been determined to occur, to a predetermined current value (a second predetermined current value) or below, or by a predetermined proportion (a second predetermined proportion) or greater. On the other hand, the single-wheel drive reduction unit 17 causes the motor 6 for the drive wheel 2 at which the slippage with the degree not less than the predetermined value has not been determined to occur, to generate a driving force that depends on a depression of the accelerator pedal 22 operated by a driver.

It is to be noted that the dual-wheel drive reduction unit 16 is deactivated while the on-off switch 25 is on. Further, in either of the case where the dual-wheel drive reduction unit 16 is activated to reduce a current or where the single-wheel drive reduction unit 17 is activated to reduce a current, the predetermined values used when the slip determination unit 15 determines whether or not slippage has occurred, may be shared, or may be different from each other.

According to the electric vehicle of the above structure that includes the slip determination unit 15, when the slip determination unit 15 determines that the slippage with the degree not less than a predetermined value has occurred between at least one of the drive wheels 2 and the road surface over which the at least of the wheels is traveling, the dual-wheel drive reduction unit 16 operates to reduce drive currents of the motors 6, 6. Thus, the slippage can be suppressed and tire grip force can be restored, resulting in stabilizing the traveling. In this case, the dual-wheel drive reduction unit 16 reduces drive currents of both the left and the right motors 6, 6 to the same current not greater than the predetermined current value (the first predetermined current value), or by the same proportion not less than the predetermined proportion (the first predetermined proportion). Therefore, unlike in a case where driving of one, of the drive wheels 2, at which the slippage has occurred is suppressed, a driver is allowed to feel like driving a vehicle including a differential, and slip control can be performed while preventing the driver from feeling uncomfortable. Further, the drive currents of both the left and the right motors 6, 6 are reduced in the same manner, thereby simplifying a configuration of the control system.

The single-wheel drive reduction unit 17 provides the following advantageous effects. Namely, the vehicle may sometimes travel in a state where only one of wheels is on the road surface on which slippage is likely to occur, such as a muddy road surface, a snow road surface or an icy road surface.

Assuming that in the vehicle traveling in such state, drive currents of the motors 6, 6 for both the left and the right wheels 2, 2, are reduced, driving force becomes insufficient, and thus traveling speed may be excessively reduced. On the other hand, the single-wheel drive reduction unit 17 as described above can make one of the wheels 2, at which no slippage has occurred, driven, thereby decreasing the degree of reduction in speed as is caused by insufficient driving force. In a state where only one of the wheels 2 is being driven, a direction in which the vehicle travels may be changed due to difference in driving force between the left side and the right side. However, the single-wheel drive reduction unit 17 is caused to be activated while the on-off switch 25 configured to be turned on or off by a driver is on. Therefore, change of a traveling direction against a driver's intention may not occur. Since the driver expects that the vehicle traveling direction changes, he or she can operate a steering wheel so as to travel straight.

In the first embodiment, each motor 6 is an in-wheel motor. However, the present invention is also applicable to an electric vehicle according to, for example, a second embodiment shown in FIG. 2. In the electric vehicle according to the second embodiment, the motors 6 are mounted to, for example, a chassis for the vehicle body 1 so as to be distant from the drive wheels 2, respectively, and drive transmission components 31 are provided to transmit the rotation of the motors 6 to the drive wheels 2. The drive transmission components 31 are each implemented as, for example, a constant velocity universal joint. In the example shown in FIG. 2, the drive wheels 2 are front wheels.

Further, in either the example shown in FIG. 1 or the example shown in FIG. 2, the drive wheels 2 may be front wheels or rear wheels. Further, the present invention is applicable to an electric vehicle that includes the motors 6, 6 that independently drive the respective left and the right drive wheels 2, 2. The electric vehicle may include not only a four-wheel electric vehicle, but also a three-wheel electric vehicle or an electric vehicle having four or more wheels. Further, the present invention is also applicable to a hybrid vehicle including an internal combustion unit for driving the wheels 3 other than the drive wheels 2 driven by the motors 6.

Although the present invention has been described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . drive wheel
6 . . . motor
11 . . . control unit
14 . . . basic control unit
15 . . . slip determination unit
16 . . . dual-wheel drive reduction unit
17 . . . single-wheel drive reduction unit

What is claimed is:

1. An electric vehicle comprising:
two electric motors configured to drive left and right drive wheels, respectively; and
a controller having a computer configured to control the two motors, the controller including
a basic control unit configured to determine driving forces to be generated by the two motors such that the driving forces are equal to each other, the driving forces depending on a depression of an accelerator pedal operated by a driver,
a slip determination unit configured to determine whether or not slippage with the degree not less than a predetermined value occurs between each of the left and the right drive wheels, and a road surface, and
a dual-wheel drive reduction unit configured to reduce, when the slip determination unit determines that the slippage with the degree not less than the predetermined value has occurred between at least one of the left and the right drive wheels, and the road surface, drive currents of both the two motors to a same first predetermined current value, or by a same first predetermined proportion.

2. The electric vehicle as claimed in claim 1, further comprising an on-off switch configured to be turned on or off by a driver,
wherein the controller further includes a single-wheel drive reduction unit configured, when the slip determination unit determines that the slippage with the degree not less than the predetermined value has occurred between one of the left and the right drive wheels and the road surface while the on-off switch is on, to reduce a motor current in one, of the motors, which drives the one of the drive wheels at which the slippage with the degree not less than the predetermined value has been determined to occur, to a second predetermined current value or by a second predetermined proportion, and to cause the other, of the motors, which drives the other of the drive wheels to generate a driving force that depends on a depression of the accelerator pedal operated by the driver.

3. The electric vehicle as claimed in claim 1, further comprising a rotation detection unit configured to detect rotation speeds of the drive wheels or the motors,
wherein the slip determination unit determines, when a change rate of the rotation speed, of the drive wheel or the motor, which is detected by the rotation detection unit becomes greater than a predetermined threshold value of a rotation speed change rate, that the slippage with the degree not less than the predetermined value has occurred between the drive wheel and the road surface.

4. The electric vehicle as claimed in claim 1, wherein, when a circumferential speed of a drive wheel tire outer circumference is calculated based on a detected value of the rotation speed of the drive wheel to be slip-determined or a detected value of the rotation speed of the motor for the drive wheel to be slip-determined, and a difference between a vehicle speed and the circumferential speed of the drive wheel tire outer circumference becomes greater than a predetermined difference threshold value, the slip determination unit determines that the slippage with the degree not less than the predetermined value has occurred between the drive wheel and the road surface.

5. The electric vehicle as claimed in claim 1, wherein each of the motors forms an in-wheel motor drive system.

6. The electric vehicle as claimed in claim 1, wherein the motors are mounted to a vehicle body so as to be distant from the drive wheels driven by the motors, and
the electric vehicle further comprises drive transmission components configured to transmit rotation of the motors to the drive wheels driven by the motors, respectively.

* * * * *